United States Patent [19]

Goerrissen et al.

[11] Patent Number: 4,987,176

[45] Date of Patent: Jan. 22, 1991

[54] WOLLASTONITE-REINFORCED POLYOXYMETHYLENE MOLDING MATERIALS AND THEIR PREPARATION

[75] Inventors: Heiner Goerrissen, Ludwigshafen; Gerhard Heinz, Weisenheim; Albrecht Hilt; Georg N. Simon, both of Limburgerhof, all of Fed. Rep. of Germany

[73] Assignee: BASF Aktiengesellschaft, Ludwigshafen, Fed. Rep. of Germany

[21] Appl. No.: 221,517

[22] Filed: Jul. 20, 1988

[30] Foreign Application Priority Data

Jul. 28, 1987 [DE] Fed. Rep. of Germany ....... 3724869

[51] Int. Cl.⁵ .................................................. C08K 3/34
[52] U.S. Cl. ................................... 524/456; 428/331; 524/593; 528/250
[58] Field of Search ................... 524/456, 593, 100

[56] References Cited

U.S. PATENT DOCUMENTS

4,127,554  11/1978  Soder ................................. 524/89
4,645,785  2/1987  Heinz et al. ..................... 524/593

FOREIGN PATENT DOCUMENTS

0122560  10/1984  European Pat. Off. .
0181542  5/1986  European Pat. Off. .
1208490  11/1980  Fed. Rep. of Germany .
3303760  8/1984  Fed. Rep. of Germany .
127346  7/1985  Japan .
1069752  9/1969  United Kingdom .

OTHER PUBLICATIONS

*Machine Design,* vol. 52, Jun. 1980, pp. 113–116, "How Mineral Fillers Improve Plastics".

*Primary Examiner*—George F. Lesmes
*Assistant Examiner*—Christopher Brown
*Attorney, Agent, or Firm*—Oblon, Spivak, McClelland, Maier & Neustadt

[57] ABSTRACT

Reinforced polyoxymethylene materials containing
(A) one or more polyoxymethylene homopolymers and/or copolymers and
(B) wollastonite, advantageously in a weight ratio of components (A) to (B) of from 95:50 to 5:50, with or without
(C) additives in effective amounts, the wollastonite crystals (B) have a mean thickness equal to or smaller than 5 μm and a mean length/thickness ratio equal to or greater than 5. The molding materials are prepared by introducing the wollastonite crystals (B) into the melt of component (A) at from 180° to 260° C., advantageously by means of an extruder.

8 Claims, No Drawings

WOLLASTONITE-REINFORCED POLYOXYMETHYLENE MOLDING MATERIALS AND THEIR PREPARATION

It is known that polyoxymethylene homopolymers and/or copolymers, referred to below as POM for short, can be provided with reinforcing agents and additives in order to improve certain physical properties and to extend their possible uses.

According to DE-A-1 208 490 (GB-A-999 422), POM which contain metals, metal oxides, metal carbonates, metal silicates, carbon, silica and/or boron and may contain glass fibers and asbestos fibers are used for the production of composite materials.

However, no information has been disclosed regarding the particle size of the fillers used.

Reinforced molding materials consisting of thermoplastics, which do not contain any aliphatically unsaturated groups, and inorganic reinforcing agents which are bound to the thermoplastic matrix by coupling agents, eg. silanes, are described in, for example, GB-A-1 069 752. Suitable reinforcing agents, which preferably have particle sizes of less than 250 μm and are used in an amount of, preferably, from 40 to 95% by weight, based on the total weight of the molding materials, are, for example, calcium silicate, aluminum silicate, magnesium silicate and calcium magnesium silicate.

According to DE-B-23 19 359 (U.S. Pat. No. 3,775,363), compression molding materials and molding materials having improved processibility consist of an intimate mixture of from 98 to 25% by weight of POM and from 2 to 75% by weight of an acicular calcium metasilicate ($CaSiO_3$) which does not contain any coupling agents. This Published Application too does not give any information regarding the particle size and the length/thickness ratio of the reinforcing agent.

The use of fillers having a mean particle size of less than 10 μm for improving the notched impact strength of molding materials of POM and thermoplastic polyurethane is described in DE-A-33 03 760 (U.S. Pat. No. 4 517 319).

According to EP-A-0 181 542 (U.S. Pat. No. 4,645,785), thermoplastic POM molding materials having high abrasion resistance contain from 40 to 94.7 parts by weight of a POM, from 5 to 50 parts by weight of wollastonite, from 0.2 to 5 parts by weight of N-hydroxymethylmelamine in which some or all of the hydroxymethyl groups are etherified with alkanols, from 0.1 to 5 parts by weight of silicone oil having a degree of polycondensation n of from 10 to 5,000 and/or from 0.1 to 10 parts by weight of polyethylene and/or copolymers of ethylene with α-olefins having a molecular weight of from 100,000 to 1,000,000, with or without additives. Regarding the wollastonite used, it should merely be noted that the acicular calcium metasilicate generally has a particle size of from 1 to 10 μm.

Mechanical incorporation of the fillers into POM has also been disclosed, suitable apparatuses being, for example, kneading machines and screw extruders. For example, according to DE-B-16 69 752, the fillers are incorporated into POM in the presence of from 1 to 20% by weight of 1,3,5-trioxane, and the 1,3,5-trioxane and any further volatile components are substantially removed from the POM after the filler-containing POM has melted in devolatilization apparatuses.

It is an object of the present invention to improve the mechanical properties of POM molding materials containing a filler, in particular wollastonite.

We have found that this object is achieved, surprisingly, by the use of wollastonite having a certain crystal form.

The present invention thus relates to reinforced polyoxymethylene molding materials which contain
(A) one or more polyoxymethylene polymers selected from the group consisting of the polyoxymethylene homopolymers, polyoxymethylene copolymers and mixtures thereof and
(B) wollastonite ($CaSiO_3$), with or without
(C) additives in an effective amount,
wherein the acicular wollastonite crystals (B) have a mean needle thickness (diameter) equal to or smaller than 5 μm, preferably equal to or smaller than 4 μm, and a mean length/thickness ratio equal to or greater than 5, preferably equal to or greater than 7.

The present invention furthermore relates to a process for the preparation of the novel wollastonite-reinforced polyoxymethylene molding materials as claimed in any of claims 1 to 4, wherein the wollastonite crystals (B) have a mean thickness equal to or smaller than 5 μm and a mean length/thickness ratio equal to or greater than 5 and are introduced into the melt of component (A).

Surprisingly, it was found that the mechanical properties of the resulting POM molding materials are influenced not only by the particle size distribution of the fillers but also by the shape of the wollastonite used.

The polyoxymethylene molding materials reinforced according to the invention advantageously contain or consist of
(A) from 95 to 50, preferably from 90 to 60, parts by weight of one or more polyoxymethylene homopolymers and/or copolymers and
(B) from 5 to 50, preferably from 10 to 40, parts by weight of wollastonite, the number of parts by weight of components (A) and (B) summing to 100 parts by weight, with or without
(C) additives in effective amounts, and, where the additives are not completely dispensible, ie. the amount is equal to zero, effective amounts usually means a total amount of from 0.01 to 60, preferably from 0.02 to 30, parts by weight per 100 parts by weight of the total amount of components (A) and (B).

Regarding the components which may be used for the preparation of the POM molding materials reinforced according to the invention, the following may be stated: (A) Suitable polyoxymethylenes (A) are homopolymers of formaldehyde or copolymers of formaldehyde and of trioxane with cyclic and/or linear formals, such as butanediol formal, or epoxides, such as ethylene oxide or propylene oxide. As a rule, the homopolymers have thermally stable terminal groups such as ester or ether groups. The copolymers of formaldehyde or of trioxane advantageously have more than 50%, in particular more than 75%, of oxymethylene groups. Copolymers which contain not less than 0.1% of groups of the comonomer which have two or more adjacent carbon atoms in the chain have proven particularly useful. Polyoxymethylenes which contain from 1 to 10% by weight of comonomers have become particularly important industrially. Such copolymers are obtainable in a conventional manner by cationic polymerization of trioxane with suitable comonomers, such as cyclic ethers or acetals, e.g. ethylene oxide, 1,3-dioxolane, 1,3-dioxane or 1,3-dioxacycloheptane, or with linear oligoformals or polyformals, such as polydioxolane or polybutanediol formal. As a rule, the polyoxymethylenes used have a weight average molecular weight of from 2,000 to 100,000, preferably from 10,000 to 100,000, and an MFI, at 190° C. and 21.17N, of from 0.5 to 200, preferably from 1 to 50, according to DIN 53,735. Polymers which are composed of trioxane and from 1 to 10 mol % of ethylene oxide, 1,3-dioxolane or butanediol formal have become particularly important. As stated above, the novel molding materials advantageously contain from 50 to 95% by weight, based on the weight of components (A) and (B), of one or more polyoxymethylenes.

Compounds having a plurality of polymerizable groups in the molecule, for example alkyl glycidyl formals, polyglycol diglycidyl ethers, alkanediol diglycidyl ethers or bis-(alkanetriol)-triformals, may be used as additional comonomers for trioxane, in an amount of from 0.05 to 5, preferably from 0.1 to 2, % by weight, based on the total amount of monomers. (B) The reinforced molding materials contain, as component (B), wollastonite, an acicular calcium metasilicate ($CaSiO_3$), which, according to the invention, has a mean thickness (diameter) equal to or smaller than 5 μm, preferably from 0.5 to 5 μm, in particular from 0.8 to 4 μm and a mean length/thickness ratio equal to or greater than 5, preferably from 5 to 25, in particular from 7 to 20. The wollastonite used may additionally be treated with silanes, eg. γ-aminopropyltriethoxysilane. (C) The POM molding materials reinforced according to the invention can, as stated above, contain additives (C) in effective amounts. Examples of suitable additives are:

N-hydroxymethylmelamines in which some or all of the hydroxymethyl groups are etherified with alkanols. The melamines advantageously contain from 2 to 6 hydroxymethyl groups, some of which are etherified with $C_1$-$C_4$-alkanols. Preferred melamines are those having two or more, preferably four or more, hydroxymethyl groups which are completely etherified with $C_1$-$C_4$-alkanols. Examples of suitable compounds are dimethoxymethylmelamine, diethoxymethylmelamine, triethyoxymethylmelamine, tetramethoxymethylmelamine and tetrabutoxymethylmelamine. Tetramethoxymethylmelamine has proven particularly useful. The abovementioned melamine derivatives are obtainable in a conventional manner, as described in detail in, for example, Houben-Weyl, Methoden der organischen Chemie, 4th Edition, Volume 14/2, page 368. From 0.2 to 5, preferably from 0.2 to 2, parts by weight of the partially etherified N-hydroxymethylmelamines are usually employed per 100 parts by weight of the total amount of components (A) and (B).

Silicone oils having a degree of polycondensation n of from 10 to 5,000, which may be used in an amount of from 0.1 to 5, preferably from 0.5 to 2, parts by weight per 100 parts by weight of the total amount of components (A) and (B). Suitable silicone oils are described, for example, by Walter Noll in Chemie und Technologie der Silicone, Verlag Chemie, 1968, pages 393-396. Examples of suitable siloxane compounds are those of the formula

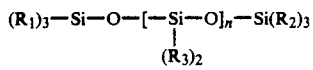

where $R_1$ and $R_2$ may be identical or different and are each $C_1$-$C_4$-alkyl or phenyl and $R_3$ is $C_1$-$C_4$-alkyl, phenyl or a radical of the formula $$-O-[Si-O]_n-R_1$$

where $R_1$ has the above meanings and n is an integer from 0 to 50.

Instead of the silicone oils, or in addition to them, the POM molding materials reinforced according to the invention may contain from 0.1 to 10, preferably from 0.5 to 5, parts by weight of polyethylene and/or copolymers of ethylene with α-olefins having a molecular weight of from 100,000 to 1,000,000, per 100 parts by weight of the total amount of components (A) and (B). Suitable α-olefins advantageously have 3 to 6 carbon atoms. The comonomers are advantageously bound in the copolymer in amounts of from 1 to 15 mol %. High and low density polyethylenes are preferably used.

Examples of other suitable additives (C) which may also be used are stabilizers, nucleating agents, antistatic agents, light stabilizers, flameproofing agents, slip agents, lubricants, plasticizers, pigments, dyes, optical brighteners, mold release agents and the like. One or more antioxidants having a phenolic structure have proven particularly useful as additive (C) and are therefore preferably used. Such antioxidants are described in, for example, DE-A-No. 27 02 661.

Particularly suitable heat stabilizers are polyamides, amides of polybasic carboxylic acids, amidines, e.g. dicyandiamide, hydrazines, ureas, poly-(N-vinyllactams) and alkaline earth metal salts of aliphatic, preferably hydroxyl-containing, monobasic to tribasic carboxylic acids of 2 to 20 carbon atoms, e.g. calcium stearate, calcium ricinoleate, calcium lactate and calcium citrate. Bisphenol compounds, in particular, are used as oxidation stabilizers, preferably diesters of monobasic 4-hydroxyphenylalkanoic acids of 7 to 13, preferably 7, 8 or 9, carbon atoms with diols of 2 to 6 carbon atoms. Examples of suitable light stabilizers are α-hydroxybenzophenone derivatives and benzotriazole derivatives. The stabilizers are generally used in a total amount of from 0.1 to 5, preferably from 0.5 to 3, by weight, based on the weight of components (A) and (B).

Other suitable additives (C) are reinforcing fillers, such as fibers, for example carbon fibers or, in particular, glass fibers, which may be treated with adhesion promoters and/or sizes. The fibers, which may be used in amounts of from 5 to 60, preferably from 10 to 40, % by weight, based on the weight of components (A) and (B), advantageously have a diameter of from 5 to 20 μm, preferably from 8 to 15 μm, and, in granules, generally possess a mean fiber length of from 0.05 to 1 mm, preferably from 0.1 to 0.5 mm.

For the preparation of the POM molding materials reinforced according to the invention, the wollastonite (B) and, where relevant, the additives (C) are preferably introduced directly into the melt of one or more polyoxymethylene homopolymers and/or copolymers (A) by means of a suitable known apparatus. Apparatuses which have proven particularly useful for this purpose and are therefore preferably employed are extruders, in particular twin-screw extruders, in which the POM is melted and the wollastonite (B) and, if required, the additives (C) are introduced into the melt at from 180° to 260° C., preferably from 190° to 240° C. Reinforced POM molding materials of poorer quality but having satisfactory mechanical properties can also be obtained by mixing wollastonite (B) with granulated and/or powdered POM (A) and then extruding the mixture in an extruder under the stated temperature conditions.

The novel reinforced POM molding materials are suitable for the production of moldings by injection molding or extrusion. The moldings produced are used, inter alia, in the automotive industry, electrical appliances industry and electronics industry.

EXAMPLES 1 TO 7 AND COMPARATIVE EXAMPLES A TO L

The Examples and Comparative Examples were carried out using a copolymer of trioxane with about 3% by weight, based on the total weight, of butanediol formal (Ultraform ® N 2320), having a mean molecular weight (weight average) of 70,000 and an MFI 190/2.16 of 9 g/10 min, which was used either stabilized and compounded in granular form or in the form of a crude polymer which still contained about 5% by weight of unconverted trioxane and about 5% by weight of unstable components. The following additives were added to the copolymer:

0.3% by weight of 1,6-hexanediolbis-3-(3,5-di-tert-butyl-4-hydroxyphenyl) propionate (Irganox ® 259 from Ciba-Geigy), 0.1% by weight of a polyamide having blocked terminal groups, according to Example 5-4 of US-A-No. 3 960 984, 0.3% by weight of a melamine/formaldehyde polycondensate according to Example 1 of DE-B-No. 2 540 207 and 0.5% by weight of tetra-(methoxymethyl)-melamine, similarly to EP-A-No. 0019761 and EP-A-No. 0052740.

The wollastonite used, abbreviated to woll. in the Table below, had the following mean particle diameters and mean length/thickness ratios, abbreviated to L/T ratio:

Type 1 (Comparison)

Mean particle diameter ~1 μm, L/T ratio ~2.5, without silane coating

Type 2 (Comparison)

Mean particle diameter - 2 pm, L/T ratio ~4, without silane coating

Type 3 (according to the invention)

Mean particle diameter ~3.5 μm, L/T ratio ~10, without silane coating

Type 4 (Comparison)

Mean particle diameter ~4 μm, L/T ratio ~4, without silane coating

Type 5 (Comparison)

Similar to Type 2, but coated with 0.5% by weight of γ-aminopropyltriethoxysilane

Type 6 (Comparison)

Mean particle diameter ~7 μm, L/T ratio ~10, without silane coating

Type 7 (according to the invention)

Mean particle diameter ~4 μm, L/T ratio ~15, coated with 0.5% by weight of γ-aminopropyltriethoxysilane.

Incorporation of the wollastonite into the copolymer containing additives was effected in a type ZSK 28 extruder (Werner and Pfleiderer) at 230° C. In this procedure, the wollastonite was either premixed with the copolymer and metered into the feed zone of the extruder, or the copolymer was introduced into the extruder feed zone and wollastonite was then metered separately into the copolymer melt via an orifice in the extruder. Volatile components were removed via two devolatilization orifices in the extruder. After the extrusion, the granules were injection molded at 200° C. and the following mechanical properties were determined:

tensile modulus of elasticity (N/mm$^2$) according to DIN 53,457, tensile strength (N/mm$^2$) according to DIN 53,455 and notched impact strength (kJ/m$^2$) at 23° C. according to DIN 53,753-L-3.0 (Edition 4/81).

The results obtained are summarized in the Table below.

TABLE

| Example | Comp. examp. | Copolymer | Parts by weight of copolymer | Parts by weight of woll. | Woll. type | Method of incorporation | Modulus of elasticity | Tensile strength | Notched impact strength |
|---|---|---|---|---|---|---|---|---|---|
|   | A | Granules | 80 | 20 | 1 | Melt | 4280 | 69 | 15 |
|   | B | Granules | 80 | 20 | 2 | Melt | 4370 | 69 | 11 |
| 1 |   | Granules | 80 | 20 | 3 | Melt | 5260 | 72 | 13 |
|   | C | Granules | 80 | 20 | 4 | Melt | 4360 | 68 | 8 |
|   | D | Granules | 80 | 20 | 5 | Melt | 4305 | 69 | 11 |
|   | E | Granules | 80 | 20 | 6 | Melt | 4920 | 71 | 7 |
| 2 |   | Granules | 80 | 20 | 7 | Melt | 5300 | 72 | 14 |
| 3 |   | Crude polymer | 80 | 20 | 7 | Melt | 5220 | 73 | 13 |
|   | F | Crude polymer | 70 | 30 | 1 | Premixing | 5320 | 68 | 10 |
|   | G | Crude polymer | 70 | 30 | 2 | Premixing | 5310 | 69 | 11 |
|   | H | Crude polymer | 70 | 30 | 2 | Melt | 5660 | 66 | 9 |
| 4 |   | Crude polymer | 70 | 30 | 3 | Premixing | 6360 | 70 | 11 |
| 5 |   | Crude polymer | 70 | 30 | 3 | Melt | 7800 | 75 | 10 |
|   | I | Crude polymer | 70 | 30 | 4 | Premixing | 5280 | 67 | 8 |
|   | K | Crude polymer | 70 | 30 | 5 | Premixing | 5250 | 68 | 10 |
|   | L | Crude polymer | 70 | 30 | 6 | Premixing | 5510 | 66 | 7 |
| 6 |   | Crude polymer | 70 | 30 | 7 | Premixing | 6310 | 71 | 12 |
| 7 |   | Crude polymer | 70 | 30 | 7 | Melt | 7660 | 76 | 11 |

We claim:

1. A reinforced polyoxymethylene molding material consisting of (A) from 95 to 50 parts by weight of one or more polyoxymethylene polymers selected from the group consisting of the polyoxymethylene homopolymers, polyoxymethylene copolymers and mixtures thereof, (B) from 5 to 50 parts by weight of wollastonite, the number of parts by weight of components (A) and (B) summing to 100 parts by weight, and (C) from 0 to 60 parts by weight of additives, wherein the wollastonite crystals (B) have a mean thickness equal to or smaller than 5 μm and a mean length/thickness ratio equal to or greater than 5, said reinforced polyoxymethylene molding material having been subjected to a processing temperature of 180° C. to 260° C.

2. A reinforced polyoxymethylene molding material as claimed in claim 1, containing a polyoxymethylene homopolymer of copolymer (A) having a mean molecular weight (weight average) of from 2,000 to 100,000 and an MFI, at 190° C. and 21.17N, of from 0.5 to 200, according to DIN 53,735, or a mixture thereof.

3. The reinforced polyoxymethylene molding material of claim 1, wherein said polyoxymethylene copolymer is the reaction product of formaldehyde or of trioxane with a cyclic and/or linear formal or an epoxide.

4. The reinforced polyoxymethylene molding material of claim 3, wherein said polyoxymethylene copolymer has a formaldehyde or trioxane content of more than 50%.

5. The reinforced polyoxymethylene molding material of claim 1, wherein said wollastonite ingredient has a mean thickness ranging from 0.5–5 μm and mean length/thickness ratio ranging from 5–25.

6. The reinforced polyoxymethylene molding material of claim 5, wherein said wollastonite has a mean thickness ranging from 0.8–4 μm and a mean length/thickness ratio ranging from 7–20.

7. The reinforced polyoxymethylene molding material of claim 1, wherein said additive is an N-hydroxymethylamine, a silicone oil, or combinations thereof.

8. The reinforced polyoxymethylene molding material of claim 1, wherein said additive is at least one member selected from the group consisting of stabilizers, nucleating agents, reinforcing fillers, antistatic agents, light stabilizers, flame proofing agents, slip agents, lubricants, plasticizers, pigments, dyes, optical brightners, mold release agents and antioxidents.

* * * * *